(12) United States Patent
Xin et al.

(10) Patent No.: US 12,469,144 B2
(45) Date of Patent: Nov. 11, 2025

(54) SYSTEMS AND METHODS FOR IMAGE PROCESSING

(71) Applicant: SHANGHAI UNITED IMAGING HEALTHCARE CO., LTD., Shanghai (CN)

(72) Inventors: Yang Xin, Shanghai (CN); Xu Wang, Shanghai (CN); Guobin Li, Shanghai (CN)

(73) Assignee: SHANGHAI UNITED IMAGING HEALTHCARE CO., LTD., Shanghai (CN)

(*) Notice: Subject to any disclaimer, the term of this patent is extended or adjusted under 35 U.S.C. 154(b) by 353 days.

(21) Appl. No.: 17/816,382

(22) Filed: Jul. 29, 2022

(65) Prior Publication Data
US 2023/0206459 A1    Jun. 29, 2023

(30) Foreign Application Priority Data
Dec. 29, 2021   (CN) .......................... 202111642374.X

(51) Int. Cl.
| | |
|---|---|
| *G06T 7/149* | (2017.01) |
| *G01R 33/56* | (2006.01) |
| *G01R 33/563* | (2006.01) |
| *G06T 7/11* | (2017.01) |
| *G06T 11/00* | (2006.01) |
| *G06V 10/26* | (2022.01) |

(52) U.S. Cl.
CPC .......... *G06T 7/149* (2017.01); *G01R 33/5608* (2013.01); *G01R 33/5635* (2013.01); *G06T 7/11* (2017.01); *G06T 11/008* (2013.01); *G06V 10/273* (2022.01); *G06T 2207/30101* (2013.01); *G06T 2207/30204* (2013.01); *G06T 2210/41* (2013.01); *G06V 2201/031* (2022.01)

(58) Field of Classification Search
CPC ......... G06T 7/149; G06T 7/11; G06T 11/008; G06T 2207/30101; G06T 2207/30204; G06T 2210/41; G06T 2211/441; G06T 2207/10088; G06T 3/04; G01R 33/5608; G01R 33/5635; G06V 10/273; G06V 2201/031
See application file for complete search history.

(56) References Cited

U.S. PATENT DOCUMENTS

| | | |
|---|---|---|
| 8,068,655 B2 | 11/2011 | Odry et al. |
| 2006/0064004 A1* | 3/2006 | Machida ............ G01R 33/4828 600/410 |

(Continued)

FOREIGN PATENT DOCUMENTS

| | | |
|---|---|---|
| CN | 105608702 B | 10/2018 |
| CN | 110827242 A | 2/2020 |

*Primary Examiner* — Jianxun Yang
(74) *Attorney, Agent, or Firm* — METIS IP LLC

(57) ABSTRACT

The present disclosure is related to systems and methods for image processing. The method includes obtaining an original image. The original image includes at least one blood vessel region and at least one scalp region. The method includes determining an intermediate image by removing the at least one scalp region from the original image. The method includes generating at least one target image by performing a maximum intensity projection operation on the intermediate image. The at least one target image represents the at least one blood vessel region in the original image.

18 Claims, 10 Drawing Sheets

(56) References Cited

U.S. PATENT DOCUMENTS

| | | | |
|---|---|---|---|
| 2009/0087066 A1* | 4/2009 | Odry | ............ G06V 10/443 382/131 |
| 2020/0400768 A1 | 12/2020 | Guo et al. | |

* cited by examiner

1101

1102

1201

1202

SYSTEMS AND METHODS FOR IMAGE PROCESSING

CROSS-REFERENCE TO RELATED APPLICATIONS

This application claims priority of Chinese Patent Application No. 202111642374.X, filed on Dec. 29, 2021, and the contents of which are hereby incorporated by reference.

TECHNICAL FIELD

This disclosure generally relates to systems and methods for medical imaging, and more particularly, relates to systems and methods for image processing.

BACKGROUND

Blood vessels are one of the most important organs of a human body. A blood vessel imaging technology including, e.g., magnetic resonance imaging (MRI), computed tomography (CT), etc., are widely used in the diagnosis of various vascular diseases, such as calcification, stenosis, aneurysms, etc. Usually, an original image of a blood vessel includes one or more of various types of organs and/or tissues (e.g., skin tissue, adipose tissue) other than the blood vessel. An accurate diagnosis of vascular diseases may rely on a precise and rapid extraction of the blood vessel from the original image. Therefore, it is desirable to provide effective systems or methods for image processing.

SUMMARY

According to an aspect of the present disclosure, a method may be implemented on a computing device having one or more processors and one or more storage devices. The method may include obtaining an original image. The original image may include at least one blood vessel region and at least one scalp region. The method may include determining an intermediate image by removing the at least one scalp region from the original image. The method may include generating at least one target image by performing a maximum intensity projection operation on the intermediate image. The at least one target image may represent the at least one blood vessel region in the original image.

In some embodiments, the method may include generating at least one candidate image by dividing the intermediate image based on a location of the at least one blood vessel region. The method may include generating the at least one target image by performing the maximum intensity projection operation on the at least one candidate image.

In some embodiments, the method may include generating a reference image by inputting the intermediate image into a segmentation model. The reference image may include at least one marker corresponding to the at least one blood vessel region. The reference image may include generating the at least one candidate image based on the reference image.

In some embodiments, the method may include, for each marker of the at least one marker, generating a candidate image corresponding to the marker by weakening, based on the marker, a reference region in the reference image. The reference region may be a region other than a blood vessel region corresponding to the marker in the reference image.

In some embodiments, the method may include generating a processed intermediate image by performing the maximum intensity projection operation on the intermediate image. The method may include generating the at least one target image by dividing the processed intermediate image based on a location of the at least one blood vessel region.

In some embodiments, the method may include obtaining a first image based on the original image using a recognition model. The first image may include a first region, and the at least one scalp region is located outside the first region. The method may include obtaining a mask image by performing a binarization operation on the first image. The method may include determining the intermediate image by performing, based on the mask image, a masking operation on the original image.

In some embodiments, the method may include obtaining a second image by performing a down-sampling operation on the original image. The method may include obtaining a third image by performing a brightness normalization operation on the second image. The method may include obtaining the first image by inputting the third image into the recognition model.

In some embodiments, the method may include obtaining a fourth image by performing an up-sampling operation on the first image. The method may include obtaining the mask image by performing the binarization operation on the fourth image.

In some embodiments, the at least one target image may include a plurality of target images corresponding to a plurality of view angles of each of the at least one blood vessel region.

In some embodiments, the original image may include a magnetic resonance imaging (MRI) image obtained using a time of flight (TOF)-magnetic resonance angiography (MRA) technique.

According to another aspect of the present disclosure, a system may include at least one storage device storing a set of instructions, and at least one processor in communication with the at least one storage device. When executing the stored set of instructions, the at least one processor may cause the system to perform a method. The method may include obtaining an original image. The original image may include at least one blood vessel region and at least one scalp region. The method may include determining an intermediate image by removing the at least one scalp region from the original image. The method may include generating at least one target image by performing a maximum intensity projection operation on the intermediate image. The at least one target image may represent the at least one blood vessel region in the original image.

According to another aspect of the present disclosure, a non-transitory computer readable medium may include at least one set of instructions. When executed by at least one processor of a computing device, the at least one set of instructions may cause the at least one processor to effectuate a method. The method may include obtaining an original image. The original image may include at least one blood vessel region and at least one scalp region. The method may include determining an intermediate image by removing the at least one scalp region from the original image. The method may include generating at least one target image by performing a maximum intensity projection operation on the intermediate image. The at least one target image may represent the at least one blood vessel region in the original image.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. The drawings are not to scale. These embodiments are non-limiting exemplary embodiments, in which like reference numerals represent similar structures throughout the several views of the drawings, and wherein.

DETAILED DESCRIPTION

Figure 1:
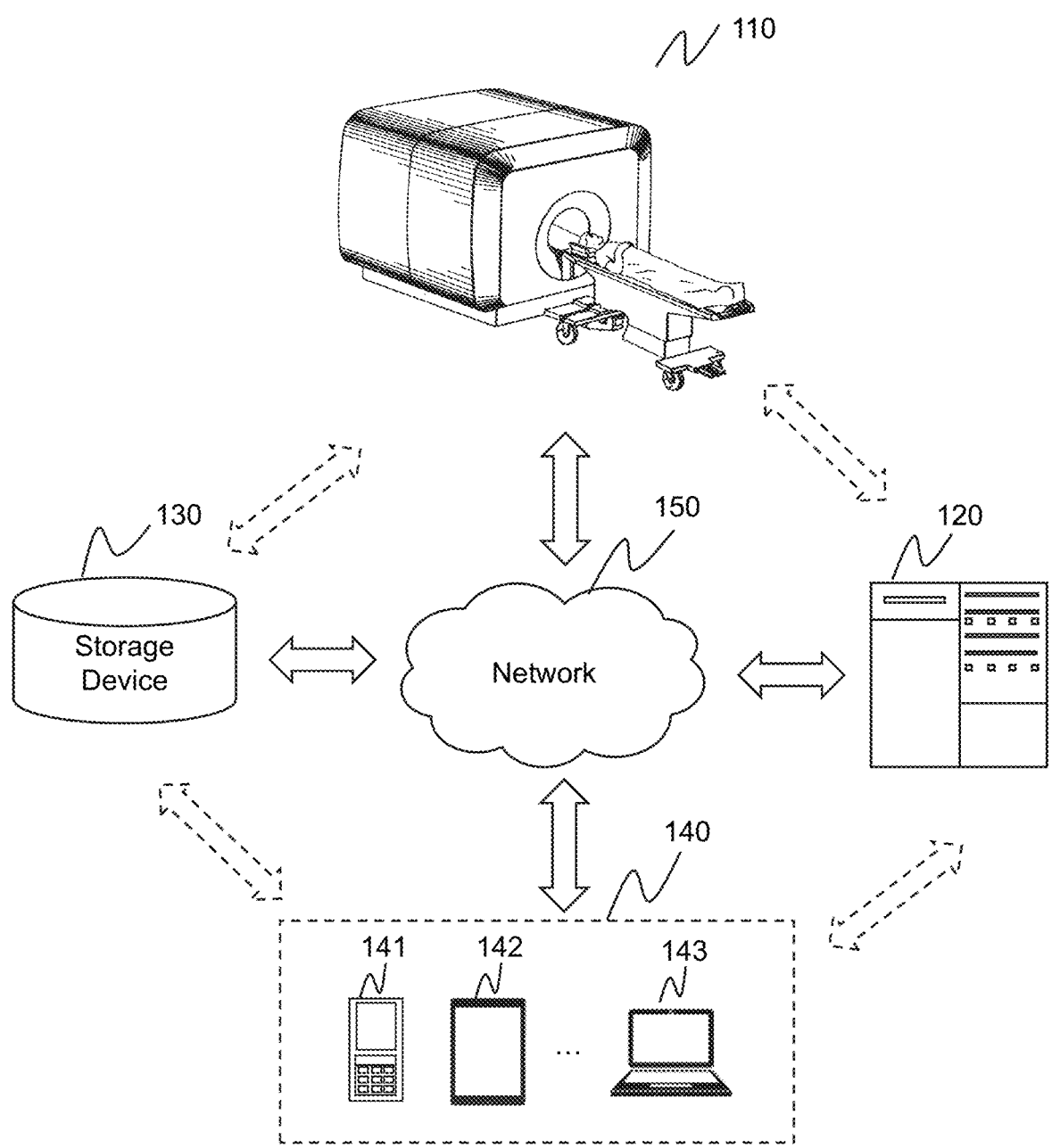
FIG. 1 is a schematic diagram illustrating an exemplary medical system according to some embodiments of the present disclosure.

In the following detailed description, numerous specific details are set forth by way of examples in order to provide a thorough understanding of the relevant disclosure. However, it should be apparent to those skilled in the art that the present disclosure may be practiced without such details. In other instances, well-known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. Also, the term "exemplary" is intended to refer to an example or illustration.

It will be understood that the terms "system," "engine," "unit," "module," and/or "block" used herein are one method to distinguish different components, elements, parts, sections or assembly of different levels in ascending order. However, the terms may be displaced by another expression if they achieve the same purpose.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that, although the terms "first," "second," "third," etc., may be used herein to describe various elements, these elements should not be limited by these terms. These terms are only used to distinguish one element from another. For example, a first element could be termed a second element, and, similarly, a second element could be termed a first element, without departing from the scope of exemplary embodiments of the present disclosure.

Spatial and functional relationships between elements are described using various terms, including "connected," "attached," and "mounted." Unless explicitly described as being "direct," when a relationship between first and second elements is described in the present disclosure, that relationship includes a direct relationship where no other intervening elements are present between the first and second elements, and also an indirect relationship where one or more intervening elements are present (either spatially or functionally) between the first and second elements. In contrast, when an element is referred to as being "directly" connected, attached, or positioned to another element, there are no intervening elements present. Other words used to describe the relationship between elements should be interpreted in a like fashion (e.g., "between," versus "directly between," "adjacent," versus "directly adjacent," etc.).

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

An aspect of the present disclosure relates to a system and method for image processing. According to some embodiments of the present disclosure, a processing device may obtain an original image. The original image may include at least one target region (e.g., a blood vessel region) and at least one peripheral region (e.g., a scalp region). As used herein, a blood vessel region in an image refers to a portion of the image, the portion including a representation of one or more blood vessels. As used herein, a peripheral region in an image including a blood vessel region refer to a portion of the image, the portion including a representation of at least an organ or tissue that surrounds or is in a vicinity of one or more blood vessels represented in the blood vessel region of the image. For example, the original image may include a magnetic resonance imaging (MRI) image obtained using a time of flight (TOF)-magnetic resonance angiography (MRA) technique. The processing device may determine an intermediate image by removing the at least one peripheral region from the original image. The processing device may generate at least one target image by performing a target processing operation (e.g., a maximum intensity projection operation) on the intermediate image. The at least one target image may represent the at least one target region in the original image.

According to some embodiments of the present disclosure, the intermediate image may be determined by removing the at least one peripheral region from the original image, and the at least one target image may be generated by performing the target processing operation on the intermediate image. Compared to a conventional way that a user needs to manually segment the at least one target region from the original image to generate the at least one target image, the automated systems and methods for image processing disclosed herein may be more accurate and efficient by, e.g., reducing the workload of a user, cross-user variations, and the time needed for image processing.

FIG. 1 is a schematic diagram illustrating an exemplary medical system according to some embodiments of the present disclosure. As illustrated, a medical system 100 may include a medical device 110, a processing device 120, a storage device 130, a terminal 140, and a network 150. The components of the medical system 100 may be connected in one or more of various ways. Merely by way of example, as illustrated in FIG. 1, the medical device 110 may be connected to the processing device 120 directly as indicated by the bi-directional arrow in dotted lines linking the medical device 110 and the processing device 120, or through the network 150. As another example, the storage device 130 may be connected to the medical device 110 directly as indicated by the bi-directional arrow in dotted lines linking the medical device 110 and the storage device 130, or through the network 150. As still another example, the terminal 140 may be connected to the processing device 120 directly as indicated by the bi-directional arrow in dotted lines linking the terminal 140 and the processing device 120, or through the network 150.

The medical device 110 may be configured to acquire imaging data relating to a subject. The imaging data relating to a subject may include an image (e.g., an image slice), projection data, or a combination thereof. In some embodiments, the imaging data may be a two-dimensional (2D) imaging data, a three-dimensional (3D) imaging data, a four-dimensional (4D) imaging data, or the like, or any combination thereof.

The subject may be biological or non-biological. For example, the subject may include a patient, a man-made object, etc. As another example, the subject may include a specific portion, an organ, and/or tissue of the patient. Specifically, the subject may include the head, the neck, the thorax, the heart, the stomach, a blood vessel, soft tissue, a tumor, or the like, or any combination thereof. In the present disclosure, "object" and "subject" are used interchangeably.

In some embodiments, the medical device 110 may include a single modality imaging device. For example, the medical device 110 may include a positron emission tomography (PET) device, a single-photon emission computed tomography (SPECT) device, a magnetic resonance imaging (MRI) device (also referred to as an MR device, an MR scanner), a computed tomography (CT) device, an ultrasound (US) device, an X-ray imaging device, or the like, or any combination thereof. In some embodiments, the medical device 110 may include a multi-modality imaging device. Exemplary multi-modality imaging devices may include a PET-CT device, a PET-MRI device, a SPET-CT device, or the like, or any combination thereof. The multi-modality imaging device may perform multi-modality imaging simultaneously. For example, the PET-CT device may generate structural X-ray CT data and functional PET data simultaneously in a single scan. The PET-MRI device may generate MRI data and PET data simultaneously in a single scan.

The processing device 120 may process data and/or information obtained from the medical device 110, the storage device 130, and/or the terminal(s) 140. For example, the processing device 120 may obtain an original image. As another example, the processing device 120 may determine an intermediate image by removing at least one peripheral region from an original image. As another example, the processing device 120 may generate at least one target image by performing a target processing operation on an intermediate image. In some embodiments, the processing device 120 may be a single server or a server group. The server group may be centralized or distributed. In some embodiments, the processing device 120 may be local or remote.

For example, the processing device 120 may access information and/or data from the medical device 110, the storage device 130, and/or the terminal(s) 140 via the network 150. As another example, the processing device 120 may be directly connected to the medical device 110, the terminal(s) 140, and/or the storage device 130 to access information and/or data. In some embodiments, the processing device 120 may be implemented on a cloud platform. For example, the cloud platform may include a private cloud, a public cloud, a hybrid cloud, a community cloud, a distributed cloud, an inter-cloud, a multi-cloud, or the like, or a combination thereof. In some embodiments, the processing device 120 may be part of the terminal 140. In some embodiments, the processing device 120 may be part of the medical device 110.

The storage device 130 may store data, instructions, and/or any other information. In some embodiments, the storage device 130 may store data obtained from the medical device 110, the processing device 120, and/or the terminal(s) 140. The data may include image data acquired by the processing device 120, algorithms and/or models for processing the image data, etc. For example, the storage device 130 may store an original image obtained from the medical device 110. As another example, the storage device 130 may store an intermediate image and/or at least one target image generated by the processing device 120. In some embodiments, the storage device 130 may store data and/or instructions that the processing device 120 and/or the terminal 140 may execute or use to perform exemplary methods described in the present disclosure. In some embodiments, the storage device 130 may include a mass storage, removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memories may include a random-access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), a high-speed RAM, etc. Exemplary ROM may include a mask ROM (MROM), a programmable ROM (PROM), an erasable programmable ROM (EPROM), an electrically erasable programmable ROM (EEPROM), a compact disk ROM (CD-ROM), and a digital versatile disk ROM, etc. In some embodiments, the storage device 130 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage device 130 may be connected to the network 150 to communicate with one or more other components in the medical system 100 (e.g., the processing device 120, the terminal(s) 140). One or more components in the medical system 100 may access the data or instructions stored in the storage device 130 via the network 150. In some embodiments, the storage device 130 may be integrated into the medical device 110.

The terminal(s) 140 may be connected to and/or communicate with the medical device 110, the processing device 120, and/or the storage device 130. In some embodiments, the terminal 140 may include a mobile device 141, a tablet computer 142, a laptop computer 143, or the like, or any combination thereof. For example, the mobile device 141 may include a mobile phone, a personal digital assistant (PDA), a gaming device, a navigation device, a point of sale (POS) device, a laptop, a tablet computer, a desktop, or the like, or any combination thereof. In some embodiments, the terminal 140 may include an input device, an output device, etc. The input device may include alphanumeric and other keys that may be input via a keyboard, a touchscreen (for example, with haptics or tactile feedback), a speech input, an eye tracking input, a brain monitoring system, or any other comparable input mechanism. Other types of the input device may include a cursor control device, such as a mouse, a trackball, or cursor direction keys, etc. The output device may include a display, a printer, or the like, or any combination thereof.

The network 150 may include any suitable network that can facilitate the exchange of information and/or data for the medical system 100. In some embodiments, one or more components of the medical system 100 (e.g., the medical device 110, the processing device 120, the storage device 130, the terminal(s) 140, etc.) may communicate information and/or data with one or more other components of the medical system 100 via the network 150. For example, the processing device 120 and/or the terminal 140 may obtain an original image from the medical device 110 via the network 150. As another example, the processing device 120 and/or the terminal 140 may obtain information stored in the storage device 130 via the network 150. The network 150 may be and/or include a public network (e.g., the Internet), a private network (e.g., a local area network (LAN), a wide area network (WAN)), etc.), a wired network (e.g., an Ethernet network), a wireless network (e.g., an 802.11 network, a Wi-Fi network, etc.), a cellular network (e.g., a long term evolution (LTE) network), a frame relay network, a virtual private network (VPN), a satellite network, a telephone network, routers, hubs, witches, server computers, and/or any combination thereof. For example, the network 150 may include a cable network, a wireline network, a fiber-optic network, a telecommunications network, an intranet, a wireless local area network (WLAN), a metropolitan area network (MAN), a public telephone switched network (PSTN), a Bluetooth™ network, a ZigBee™ network, a near field communication (NFC) network, or the like, or any combination thereof. In some embodiments, the network 150 may include one or more network access points. For example, the network 150 may include wired and/or wireless network access points such as base stations and/or internet exchange points through which one or more components of the medical system 100 may be connected to the network 150 to exchange data and/or information.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. However, those variations and modifications do not depart the scope of the present disclosure.

Figure 2:
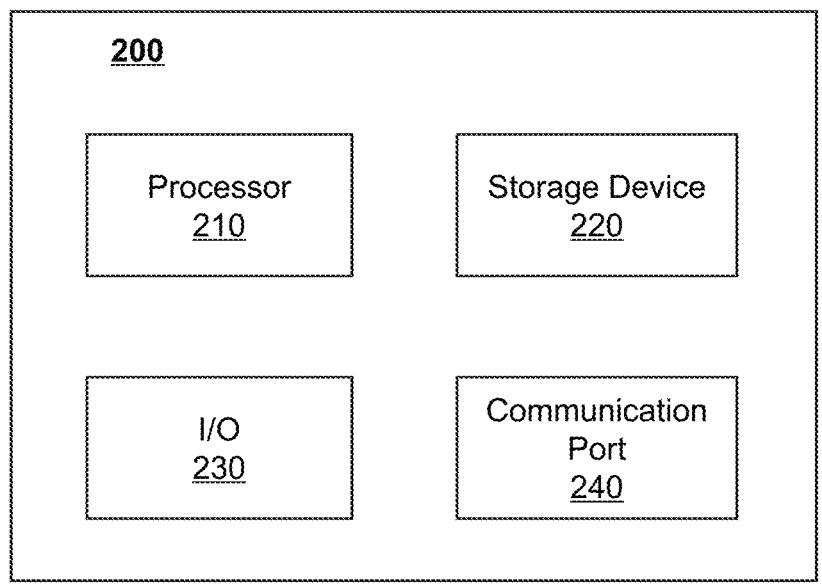
FIG. 2 is a schematic diagram illustrating exemplary hardware and/or software components of an exemplary computing device on which the processing device 120 may be implemented according to some embodiments of the present disclosure.

FIG. 2 is a schematic diagram illustrating exemplary hardware and/or software components of an exemplary computing device on which the processing device 120 may be implemented according to some embodiments of the present disclosure. As illustrated in FIG. 2, a computing device 200 may include a processor 210, a storage device 220, an input/output (I/O) 230, and a communication port 240.

The processor 210 may execute computer instructions (e.g., program code) and perform functions of the processing device 120 in accordance with techniques described herein. The computer instructions may include, for example, routines, programs, objects, components, data structures, procedures, modules, and functions, which perform particular functions described herein. For example, the processor 210 may process image data obtained from the medical device 110, the terminal 140, the storage device 130, and/or any other component of the medical system 100. In some embodiments, the processor 210 may include one or more hardware processors, such as a microcontroller, a microprocessor, a reduced instruction set computer (RISC), an application specific integrated circuits (ASICs), an application-specific instruction-set processor (ASIP), a central processing unit (CPU), a graphics processing unit (GPU), a physics processing unit (PPU), a microcontroller unit, a digital signal processor (DSP), a field programmable gate array (FPGA), an advanced RISC machine (ARM), a programmable logic device (PLD), any circuit or processor capable of executing one or more functions, or the like, or any combination thereof.

Merely for illustration, only one processor is described in the computing device 200. However, it should be noted that the computing device 200 in the present disclosure may also include multiple processors. Thus operations and/or method steps that are performed by one processor as described in the present disclosure may also be jointly or separately performed by the multiple processors. For example, if in the present disclosure the processor of the computing device 200 executes both process A and process B, it should be understood that process A and process B may also be performed by two or more different processors jointly or separately in the computing device 200 (e.g., a first processor executes process A and a second processor executes process B, or the first and second processors jointly execute processes A and B).

The storage device 220 may store data/information obtained from the medical device 110, the terminal 140, the storage device 130, and/or any other component of the medical system 100. The storage device 220 may be similar to the storage device 130 described in connection with FIG. 1, and the detailed descriptions are not repeated here.

The I/O 230 may input and/or output signals, data, information, etc. In some embodiments, the I/O 230 may enable a user interaction with the processing device 120. In some embodiments, the I/O 230 may include an input device and an output device. Examples of the input device may include a keyboard, a mouse, a touchscreen, a microphone, a sound recording device, or the like, or a combination thereof. Examples of the output device may include a display device, a loudspeaker, a printer, a projector, or the like, or a combination thereof. Examples of the display device may include a liquid crystal display (LCD), a light-emitting diode (LED)-based display, a flat panel display, a curved screen, a television device, a cathode ray tube (CRT), a touchscreen, or the like, or a combination thereof.

The communication port 240 may be connected to a network (e.g., the network 150) to facilitate data communications. The communication port 240 may establish connections between the processing device 120 and the medical device 110, the terminal 140, and/or the storage device 130. The connection may be a wired connection, a wireless connection, any other communication connection that can enable data transmission and/or reception, and/or any combination of these connections. The wired connection may include, for example, an electrical cable, an optical cable, a telephone wire, or the like, or any combination thereof. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. In some embodiments, the communication port 240 may be and/or include a standardized communication port, such as RS232, RS485. In some embodiments, the communication port 240 may be a specially designed communication port. For example, the communication port 240 may be designed in accordance with the digital imaging and communications in medicine (DICOM) protocol.

Figure 3:
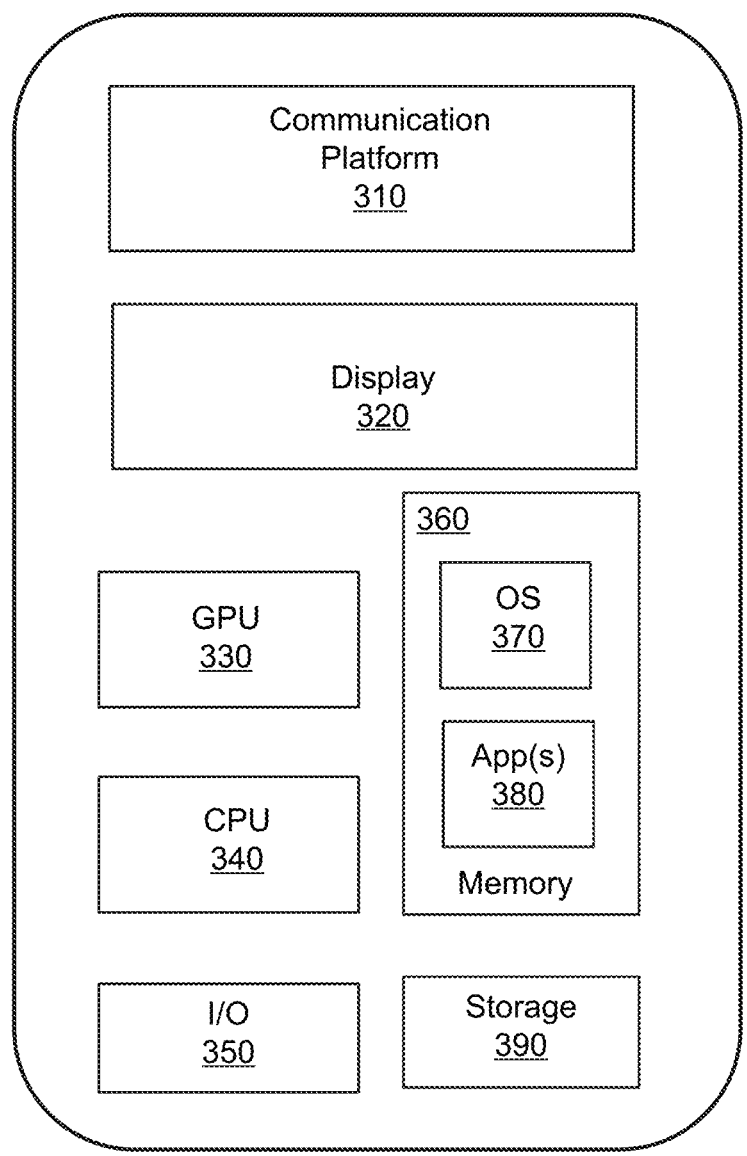
FIG. 3 is a schematic diagram illustrating exemplary hardware and/or software components of an exemplary mobile device according to some embodiments of the present disclosure.

FIG. 3 is a schematic diagram illustrating exemplary hardware and/or software components of an exemplary mobile device according to some embodiments of the present disclosure. In some embodiments, the terminal 140 and/or the processing device 120 may be implemented on a mobile device 300, respectively.

As illustrated in FIG. 3, the mobile device 300 may include a communication platform 310, a display 320, a graphics processing unit (GPU) 330, a central processing unit (CPU) 340, an I/O 350, a memory 360, and storage 390. In some embodiments, any other suitable component, including but not limited to a system bus or a controller (not shown), may also be included in the mobile device 300.

In some embodiments, the communication platform 310 may be configured to establish a connection between the mobile device 300 and other components of the medical system 100, and enable data and/or signal to be transmitted between the mobile device 300 and other components of the medical system 100. For example, the communication platform 310 may establish a wireless connection between the mobile device 300 and the medical device 110, and/or the processing device 120. The wireless connection may include, for example, a Bluetooth™ link, a Wi-Fi™ link, a WiMax™ link, a WLAN link, a ZigBee link, a mobile network link (e.g., 3G, 4G, 5G), or the like, or any combination thereof. The communication platform 310 may also enable the data and/or signal between the mobile device 300 and other components of the medical system 100. For example, the communication platform 310 may transmit data and/or signals inputted by a user to other components of the medical system 100. The inputted data and/or signals may include a user instruction. As another example, the communication platform 310 may receive data and/or signals transmitted from the processing device 120. The received data and/or signals may include imaging data acquired by the medical device 110.

In some embodiments, a mobile operating system (OS) 370 (e.g., iOS™ Android™, Windows Phone™, etc.) and one or more applications (App(s)) 380 may be loaded into the memory 360 from the storage 390 in order to be executed by the CPU 340. The applications 380 may include a browser or any other suitable mobile apps for receiving and rendering information from the processing device 120. User interactions with the information stream may be achieved via the I/O 350 and provided to the processing device 120 and/or other components of the medical system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or another type of work station or terminal device, although a computer may also act as a server if appropriately programmed. It is believed that those skilled in the art are familiar with the structure, programming and general operation of such computer equipment and as a result the drawings should be self-explanatory.

Figure 4:
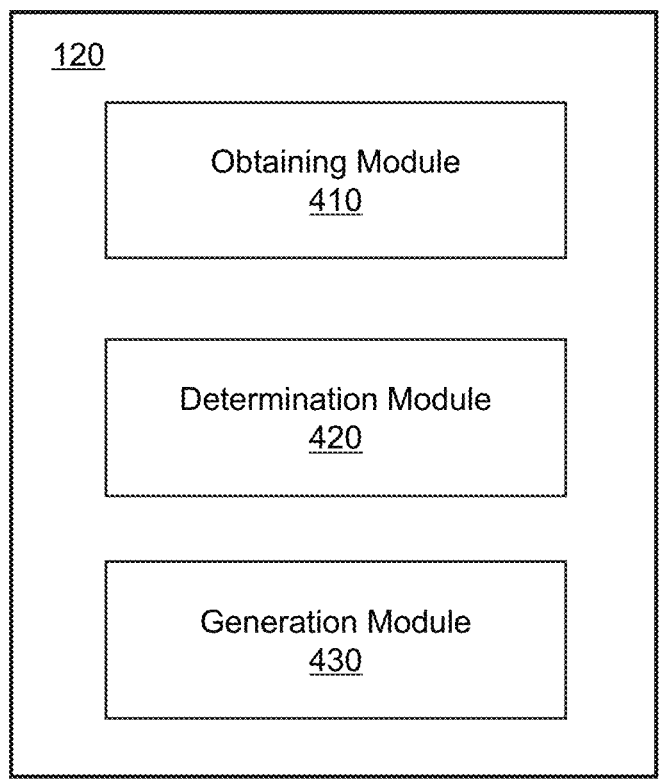
FIG. 4 is a schematic diagram illustrating an exemplary processing device according to some embodiments of the present disclosure.

FIG. 4 is a schematic diagram illustrating an exemplary processing device according to some embodiments of the present disclosure. In some embodiments, the processing device 120 may include an obtaining module 410, a determination module 420, and a generation module 430.

The obtaining module 410 may be configured to obtain data and/or information of the medical system 100. The data and/or information of the medical system 100 may include an original image, a user input, or the like, or any combination thereof. For example, the obtaining module 410 may obtain an original image. More descriptions for obtaining the original image may be found elsewhere in the present disclosure (e.g., operation 510 in FIG. 5 and descriptions thereof).

The determination module 420 may be configured to determine an intermediate image by removing at least one peripheral region from an original image. For example, the determination module 420 may obtain a first image based on the original image using a recognition model. The determination module 420 may obtain a mask image by performing a binarization operation on the first image. The determination module 420 may determine the intermediate image by performing, based on the mask image, a masking operation on the original image. More descriptions for determining the intermediate image may be found elsewhere in the present disclosure (e.g., operation 520 in FIG. 5 and descriptions thereof).

The generation module 430 may be configured to generate at least one target image by performing a maximum intensity projection operation on an intermediate image. For example, the generation module 430 may generate at least one candidate image by dividing the intermediate image based on the location of the at least one target region. The generation module 430 may generate the at least one target image by performing the target processing operation on the at least one candidate image. More descriptions for generating the at least one target image based on the at least one candidate image may be found elsewhere in the present disclosure (e.g., FIG. 6 and descriptions thereof). As another example, the generation module 430 may generate a processed intermediate image by performing the target processing operation on the intermediate image. The generation module 430 may generate the at least one target image by dividing the processed intermediate image based on the location of the at least one target region. More descriptions for generating the at least one target image based on the processed intermediate image may be found elsewhere in the present disclosure (e.g., FIG. 7 and descriptions thereof).

It should be noted that the above description of the processing device 120 is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. In some embodiments, one or more modules may be combined into a single module. For example, the determination module 420 and the generation module 430 may be combined into a single module. In some embodiments, one or more modules may be added or omitted in the processing device 120. For example, the processing device 120 may further include a storage module (not shown in FIG. 4) configured to store data and/or information (e.g., an original image, an intermediate image, at least one target image) associated with the medical system 100. As another example, the processing device 120 may further include a training module (not shown in FIG. 4) configured to generate a model (e.g., a segmentation model, a recognition model).

Figure 5:
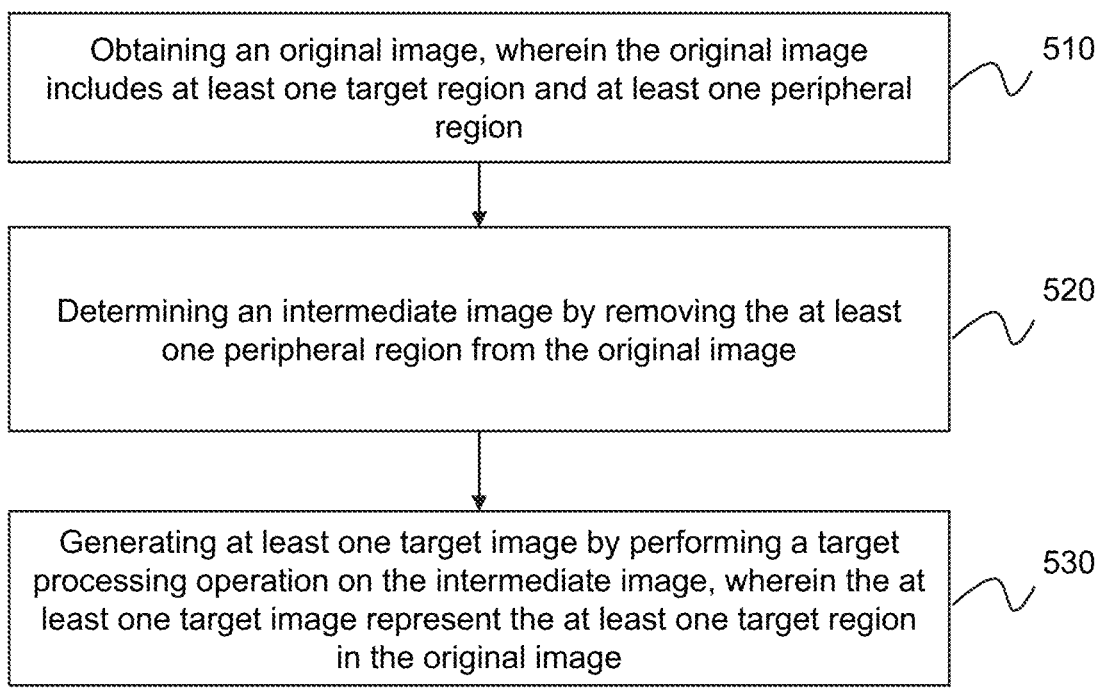
FIG. 5 is a flowchart illustrating an exemplary process for generating at least one target image according to some embodiments of the present disclosure.

FIG. 5 is a flowchart illustrating an exemplary process for generating at least one target image according to some embodiments of the present disclosure. In some embodiments, process 500 may be executed by the medical system 100. For example, the process 500 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 500. The operations of the illustrated process presented below are intended to be illustrative. In some embodiments, the process 500 may be accomplished with one or more additional operations not described and/or without one or more of the operations discussed. Additionally, the order of the operations of process 500 illustrated in FIG. 5 and described below is not intended to be limiting.

In 510, the processing device 120 (e.g., the obtaining module 410) may obtain an original image. The original image may include at least one target region and at least one peripheral region.

In some embodiments, the original image may include a two-dimensional (2D) image, a three-dimensional (3D) image, a four-dimensional (4D) image (e.g., a series of 3D images over time), and/or any related image data. In some embodiments, the original image may include color image data, point-cloud data, depth image data, mesh data, scan data, projection data, or the like, or any combination thereof. In some embodiments, the processing device 120 may obtain a plurality of sub-original images (e.g., 2D images). The processing device 120 may obtain the original image (e.g., a 3D image) by combining the plurality of sub-original images (e.g., 2D images).

In some embodiments, the original image, or image date of the original image, may be acquired by a medical device (e.g., the medical device 110). The original image may include a medical image. In some embodiments, the original image may include a CT image, an MRI image, a PET image, an ultrasound (US) image, an X-ray image, a DSA image, an MRA image, a CTA image, or the like. For example, the original image may be an MRI image obtained using a time of flight (TOF)-magnetic resonance angiography (MRA) technique.

In some embodiments, 510 may include that the processing device 120 obtains the original image directly from the medical device. In some embodiments, 510 may include that the processing device 120 obtains image data acquired using the medical device and generates the original image by performing, e.g., an image reconstruction using the image data. In some embodiments, the original image may be acquired by the medical device, and stored in a storage device (e.g., the storage device 130, the storage device 220, the storage 390, or an external source); 510 may include that the processing device 120 retrieves the original image from the storage device. In some embodiments, image data may be acquired by the medical device, and stored in a storage device (e.g., the storage device 130, the storage device 220, the storage 390, or an external source); 510 may include that the processing device 120 retrieves from the storage device the image data and generates the original image by performing, e.g., an image reconstruction using the image data.

In some embodiments, the original image may include the at least one target region and the at least one peripheral region. As used herein, a target region in an image refers to a portion of the image to be segmented and/or identified in an image processing process, and a peripheral region in an image refers to a portion of the image to be removed in the image processing process. In some embodiments, in a blood vessel extraction process, the at least one target region may include a blood vessel region, and the at least one peripheral region may include organs and/or tissue surrounding the blood vessel region. For example, in a brain blood vessel extraction process, the at least one target region may include a brain blood vessel region (e.g., a portion of the original image including a representation of anterior cerebral arteries, middle cerebral arteries), and the at least one peripheral region may include a scalp region (e.g., a portion of the original image including a representation of the scalp that surrounds or in a vicinity of one or more brain blood vessels of interest represented in the brain blood vessel region of the original image). As another example, in a neck blood vessel extraction process, the at least one target region may include a neck blood vessel region (e.g., a portion of the original image including a representation of carotid arteries), and the at least one peripheral region may include a skin tissue region and an adipose tissue region (e.g., a portion of the original image including a representation of the skin tissue and the adipose tissue that surrounds or in a vicinity of one or more neck blood vessels of interest represented in the neck blood vessel region of the original image). As still another example, in a renal artery extraction process, the at least one target region may include a renal artery region (e.g., a portion of the original image including a representation of a renal artery), and the at least one peripheral region may include a skin tissue region, an adipose tissue region, and an organ region (e.g., a portion of the original image including a representation of the skin tissue, the adipose tissue, and the organs in the abdominal cavity that surrounds or in a vicinity of the renal artery represented in the renal artery region of the original image). In some embodiments, the at least one target region may include a lesion that needs to be analyzed (e.g., tumor tissue), and the at least one peripheral region may include normal tissue (e.g., healthy tissue).

In 520, the processing device 120 (e.g., the determination module 420) may determine an intermediate image by removing the at least one peripheral region from the original image.

As used herein, an intermediate image refers to an image obtained by removing the at least one peripheral region from the original image. For example, the original image and the intermediate image may be 3D images. As another example, the original image and the intermediate image may be 2D images.

In some embodiments, the processing device 120 may obtain a first image based on the original image using a recognition model. The first image may include a first region. The at least one peripheral region may be located outside the first region. That is, the first region may include a portion of the original image that excludes the at least one peripheral region. In some embodiments, the first region may be marked in the first image in a form of color or text. In some embodiments, the first image may be a binary image in which a value (e.g., a gray value) of an element may be between "0" and "1." As used herein, an element of an image refers to a pixel or a voxel of the image. For example, gray values of elements in the first region of the first image may be set as "1," and gray values of elements in a region other than the first region in the first image may be set between "0" and "1." In some embodiments, the first image may be a heat map. The heat map may visualize data in a form of colored map. For example, the first image may include a plurality of cells. Each cell may include at least one element of the first image. The color of a cell may reflect an average gray value of the at least one element in the cell. For example, a relatively dark color of a cell may correspond to a relatively high gray value of the at least one element in the cell.

For example, the processing device 120 may obtain a second image by performing a down-sampling operation on the original image. As used herein, a down-sampling refers to a process for reducing a sampling rate of a signal, e.g., reducing a size of an image. The down-sampling operation may be used to reduce a storage and/or a bandwidth needs for transmission of an image, and/or improve a processing speed of the image. In some embodiments, the processing device 120 may perform the down-sampling operation on the original image by interval sampling of element values of the original image. An interval distance between adjacent sampled elements may be set as 1 mm, 2 mm, or the like. Merely by way of example, the original image may be sampled at an interval distance of 2 mm to generate the second image. That is, the interval distance between adjacent elements in the second image may be 2 mm. In some embodiments, in different direction of the original image, the interval distance between adjacent sampled elements may be different or the same.

In some embodiments, the down-sampling operation may be performed according to a down-sampling factor (e.g., K). For example, the processing device 120 may perform the down-sampling operation on an input image (i.e., the original image) by setting an element value of an element in an output image (i.e., the second image) to an average value of one or more element values of one or more elements in a corresponding K×K blocks in the input image (i.e., the original image). The down-sampling factor may be an integer or a rational fraction greater than 1. For example, the down-sampling factor may be 2, 3, 4, 5, or the like. Merely by way of example, the size of the original image is 256×256, and the size of the second image obtained by down-sampling, based on the down-sampling factor of 2, the original image is 64×64. In some embodiments, in different direction of the original image, the down-sampling factors may be different or the same.

In some embodiments, the interval distance and/or the down-sampling factor may be a default parameter stored in a storage device (e.g., the storage device 130). Additionally or alternatively, the interval distance and/or the down-sampling factor may be set manually or determined by one or more components of the medical system 100 according to different situations. For example, the interval distance and/or the down-sampling factor may be determined based on a processing power of the processing device 120. As another example, the interval distance and/or the down-sampling factor may be determined based on a processing power of the recognition model. As still another example, the interval distance and/or the down-sampling factor may be determined based on types (e.g., a structure, a size) of the at least one target region and the at least one peripheral region. The interval distance or the down-sampling factor may be set as a suitable value such that a boundary between the at least one target region and the at least one peripheral region can be clearly distinguished in the second image.

According to some embodiments of the present disclosure, the second image may be generated by performing the down-sampling operation on the original image. Compared with the original image, the size of the second image may be smaller, and accordingly the processing efficiency of the second image may be improved.

The processing device 120 may obtain a third image by performing a brightness normalization operation on the second image. As used herein, a brightness normalization refers to a process of normalizing element values of an image (e.g., the second image) to be between 0-1. Accordingly, the third image may be generated by performing the brightness normalization operation on the second image. The element values of the third image can be in a preset range (e.g., 0-1), which may reduce or avoid an adverse impact on the image processing result from a relatively high or low element value in the second image.

The processing device 120 may obtain the first image by inputting the third image into the recognition model. The recognition model refers to a model (e.g., a machine learning model) or an algorithm for determining the first image based on the third image (or the original image, the second image). For example, the processing device 120 may input the third image into the recognition model. The third image may include a blood vessel region and a scalp region. The recognition model may output the first image. The first region may be marked in the first image, and the scalp region may be located outside the first region. That is, the recognition model may mark a region (e.g., the first region) other than the scalp region in the third image to generate the first image.

In some embodiments, the recognition model may be of any type of machine learning model. Merely by way of example, the recognition model may include an artificial neural network (ANN), a random forest model, a support vector machine, a decision tree, a convolutional neural network (CNN), a recurrent neural network (RNN), a deep learning model, a Bayesian network, a K-nearest neighbor (KNN) model, a generative adversarial network (GAN) model, a visual geometry group (VGG) network, or the like.

In some embodiments, the recognition model may be obtained by training a preliminary model using a plurality of training samples. In some embodiments, the recognition model may be predetermined by a computing device (e.g., the processing device 120 or a computing device of a vendor of the recognition model) and stored in a storage device (e.g., the storage device 130, the storage device 220, the storage 390, or an external source). The processing device 120 may obtain the recognition model from the storage device. Alternatively, the processing device 120 may determine the recognition model by performing a training.

To train the recognition model, a plurality of training samples may be used. Each training sample may include a sample image and a standard image. The sample image may include at least one target region and at least one peripheral region. In the standard image, a sample region may be marked, and the at least one peripheral region may be located outside the sample region. In some embodiments, the sample image may be historical images obtained during historical scans of at least one sample subject (e.g., a patient). The standard image may be obtained based on the sample image. For example, the sample region may be identified and/or marked in the sample image using one or more existing feature extraction algorithms to generate the standard image. As another example, the sample region may be manually identified and/or marked in the sample image by a user (e.g., a doctor) of the medical system 100.

The training of the preliminary model may be implemented according to a machine learning algorithm, such as an artificial neural network algorithm, a deep learning algorithm, a decision tree algorithm, an association rule algorithm, an inductive logic programming algorithm, a support vector machine algorithm, a clustering algorithm, a Bayesian network algorithm, a reinforcement learning algorithm, a representation learning algorithm, a similarity and metric learning algorithm, a sparse dictionary learning algorithm, a genetic algorithm, a rule-based machine learning algorithm, or the like, or any combination thereof. The machine learning algorithm used to generate the recognition model may be a supervised learning algorithm, a semi-supervised learning algorithm, an unsupervised learning algorithm, or the like.

In some embodiments, the recognition model may be determined by performing a plurality of iterations to iteratively update one or more parameter values of the preliminary model. For each of the plurality of iterations, a specific training sample may first be input into the preliminary model. For example, a sample image in the specific training sample may be inputted into an input layer of the preliminary model, and a standard image in the specific training sample may be inputted into an output layer of the preliminary model as a desired output of the preliminary model. The preliminary model may determine a predicted output (i.e., a predicted image) of the specific training sample. The predicted output (i.e., the predicted image) may then be compared with the desired output (e.g., the standard image) based on a cost function. As used herein, a cost function of a machine learning model may be configured to assess a difference between a predicted output (e.g., the predicted image) of the machine learning model and a desired output (e.g., the standard image). If the value of the cost function exceeds a threshold in a current iteration, parameter values of the preliminary model may be adjusted and/or updated in order to decrease the value of the cost function (i.e., the difference between the predicted image and the standard image) to smaller than the threshold, and an intermediate model may be generated. Accordingly, in the next iteration, another training sample may be input into the intermediate model to train the intermediate model as described above.

The plurality of iterations may be performed to update the parameter values of the preliminary model (or the intermediate model) until a termination condition is satisfied. The termination condition may provide an indication of whether the preliminary model (or the intermediate model) is sufficiently trained. The termination condition may relate to the cost function or an iteration count of the iterative process or training process. For example, the termination condition may be satisfied if the value of the cost function associated with the preliminary model (or the intermediate model) is minimal or smaller than a threshold (e.g., a constant). As another example, the termination condition may be satisfied if the value of the cost function converges. The convergence may be deemed to have occurred if the variation of the values of the cost function in two or more consecutive iterations is smaller than a threshold (e.g., a constant). As still another example, the termination condition may be satisfied when a specified number (or count) of iterations are performed in the training process. The recognition model may be determined based on the updated parameter values.

Then, the processing device 120 may obtain a mask image by performing a binarization operation on the first image. For example, the processing device 120 may obtain a fourth image by performing an up-sampling operation on the first image. As used herein, an up-sampling may refer to a process for increasing a sampling rate of a signal, e.g., increasing a size of an image. An up-sampling operation may be typically used to increase a resolution of an image. In some embodiments, the up-sampling operation may be performed according to an up-sampling factor. In some embodiments, the up-sampling factor may be the same as or different from the down-sampling factor described elsewhere in the present disclosure, e.g., in the description of the generating of the second image by down-sampling the original image. In some embodiments, the up-sampling factor may be a default parameter stored in a storage device (e.g., the storage device 130). Additionally or alternatively, the up-sampling factor may be set manually or determined by one or more components of the medical system 100 according to different situations.

In some embodiments, the processing device 120 may perform the up-sampling operation on the first image based on an up-sampling algorithm. Exemplary up-sampling algorithms may include a linear interpolation algorithm, a nearest-neighbor interpolation algorithm, a bilinear interpolation algorithm, a mean interpolation algorithm, a median interpolation algorithm, a sinc-interpolation algorithm, a cubic convolution algorithm, or the like.

The processing device 120 may obtain the mask image by performing the binarization operation on the fourth image. The mask image may include a matrix (e.g., a two-dimensional matrix, a three-dimensional matrix), or a binary image in which the gray value of an element may be "0" or "1." Merely by way of example, the elements of the matrix corresponding to a region other than the first region of the fourth image have the value of "0", and the elements of the matrix corresponding to the first region of the fourth image have the value of "1."

Further, the processing device 120 may determine the intermediate image by performing, based on the mask image, a masking operation on the original image. In some embodiments, the masking operation may include applying the mask image (e.g., a two-dimensional matrix, a three-dimensional matrix) on the original image. By applying the mask image on the original image (e.g., making the mask image multiply by the original image), the processing device may reset the values (e.g., gray values) of the elements of the intermediate image that correspond to the region other than the first region of the fourth image to a default value (e.g., "0"), and the values (e.g., gray values) of the elements of the intermediate image that correspond to the first region of the fourth image may remain unchanged with respect to the corresponding elements in the original image.

It should be noted that the above description is merely provided for the purposes of illustration, and not intended to limit the scope of the present disclosure. In some embodiments, the brightness normalization operation may be omitted, and the processing device 120 may determine the intermediate image by removing the at least one peripheral region from the second image. For example, the processing device 120 may determine the first image by inputting the second image into the recognition model. In some embodiments, the down-sampling operation may be omitted, and the processing device 120 may obtain a fifth image by performing a brightness normalization operation on the original image. The processing device 120 may determine the first image by inputting the fifth image into the recognition model. In some embodiments, the down-sampling operation and the brightness normalization operation may be omitted, and the processing device 120 may determine the first image by inputting the original image into the recognition model. Then, the processing device 120 may determine the mask image by performing a binarization operation on the first image. Further, the processing device 120 may determine the intermediate image by performing, based on the mask image, a masking operation on the original image. In some embodiments, if the down-sampling operation is omitted, the up-sampling operation may also be omitted. For example, the processing device 120 may obtain the mask image by performing the binarization operation on the first image. In some embodiments, at least one of the image processing operations including the down-sampling, the brightness normalization, up-sampling may be incorporated into the recognition model. For instance, the recognition model may be configured to perform one or more of: (1) assess the size of an original image and determine whether to perform down-sampling based on benefit(s) that may be obtained by performing the down-sampling, (2) assess the maximum and minimum element values of the original image (or the second image), and determine whether to perform brightness normalization based on benefit(s) that may be obtained by performing the brightness normalization, (3) assess the size or the resolution of the original image (or the first image), and determine whether to perform up-sampling based on benefit(s) that may be obtained by performing the up-sampling.

According to some embodiments of the present disclosure, the first image may be obtained based on the original image using the recognition model, the efficiency of determining the first image may be improved, and accordingly the efficiency of determining the intermediate image may also be improved.

In some embodiments, the processing device 120 may obtain the intermediate image based on the original image using a processing model. The processing model refers to a model (e.g., a machine learning model) or an algorithm for determining an intermediate image based on an original image. For example, the processing device may input the original image into the processing model, and the processing model may output the intermediate image by removing the at least one peripheral region from the original image. The training process of the processing model may be similar to the training process of the recognition model, and the detailed descriptions are not repeated here.

In 530, the processing device 120 (e.g., the generation module 430) may generate at least one target image by performing a target processing operation on the intermediate image. The at least one target image may represent the at least one target region in the original image.

As used herein, a target image refers to an image including the at least one target region but no peripheral region. For example, the original image may include one or more blood vessel regions, a scalp region, and a brain tissue region. The one or more blood vessel regions may include an anterior circulation vessel region (e.g., a middle cerebral artery, an anterior cerebral artery), a posterior circulation vessel region (e.g., a vertebral artery, a basilar artery), or the like, or any combination thereof. The scalp region may be removed from the original image to generate the intermediate image, and the intermediate image may include the one or more blood vessel regions and the brain tissue region. The target processing operation may be performed on the intermediate image to generate the at least one target image. The at least one target image may include the one or more blood vessel regions.

In some embodiments, the at least one target image may include a plurality of target images corresponding to a plurality of view angles of each of the at least one target region. For example, the original image and the intermediate image may be 3D images. A plurality of rotated intermediate images corresponding to the plurality of view angles may be obtained by rotating the intermediate image. The plurality of target images corresponding to the plurality of view angles may be generated by performing the target processing operation on the plurality of rotated intermediate images. In some embodiments, the plurality of view angles may be determined according to a default setting, manually set by a user (e.g., a doctor, a technician), or determined by the processing device 120 according to an actual need. Accordingly, the plurality of target images corresponding to the plurality of view angles may be generated for display, which may be convenient for a user to view the at least one target region. Therefore, the practicability of the image processing process may be improved.

In some embodiments, the processing device 120 may determine the at least one target image based on a location of the at least one target region. For example, the processing device 120 may generate at least one candidate image by dividing the intermediate image based on the location of the at least one target region. The processing device 120 may generate the at least one target image by performing the target processing operation on the at least one candidate image. More descriptions for generating the at least one target image based on the at least one candidate image may be found elsewhere in the present disclosure (e.g., FIG. 6 and descriptions thereof).

As another example, the processing device 120 may generate a processed intermediate image by performing the target processing operation on the intermediate image. The processing device 120 may generate the at least one target image by dividing the processed intermediate image based on the location of the at least one target region. More descriptions for generating the at least one target image based on the processed intermediate image may be found elsewhere in the present disclosure (e.g., FIG. 7 and descriptions thereof).

According to some embodiments of the present disclosure, the intermediate image may be determined by removing the at least one peripheral region from the original image, and the at least one target image may be generated by performing the target processing operation on the intermediate image. Compared to a conventional way that a user needs to manually segment the at least one target region from the original image to generate the at least one target image, the automated systems and methods for image processing disclosed herein may be more accurate and efficient by, e.g., reducing the workload of a user, cross-user variations, and the time needed for image processing. Therefore, the image processing process may be simplified, and accordingly the efficiency of the image processing process may be improved.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 6:
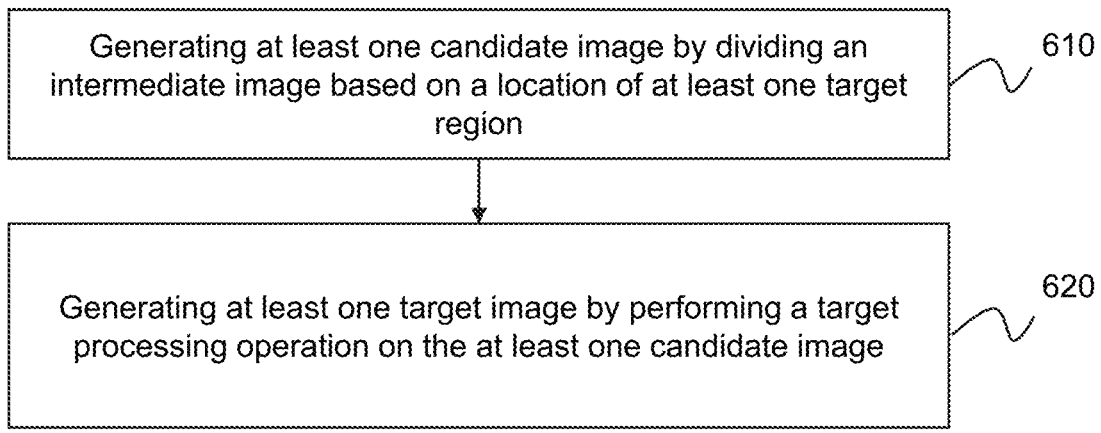
FIG. 6 is a flowchart illustrating an exemplary process for generating at least one target image according to some embodiments of the present disclosure.

FIG. 6 is a flowchart illustrating an exemplary process for generating at least one target image according to some embodiments of the present disclosure. In some embodiments, process 600 may be executed by the medical system 100. For example, the process 600 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 600. The operations of the illustrated process presented below are intended to be illustrative. In some embodiments, the process 600 may be accomplished with one or more additional operations not described and/or without one or more of the operations discussed. Additionally, the order of the operations of process 600 illustrated in FIG. 6 and described below is not intended to be limiting.

In 610, the processing device 120 (e.g., the generation module 430) may generate at least one candidate image by dividing an intermediate image based on a location of at least one target region.

In some embodiments, the processing device 120 may divide the intermediate image into the at least one candidate image based on the location of the at least one target region. Each candidate image of the at least one candidate image may correspond to one target region of the at least one target region. In some embodiments, the processing device 120 may divide the intermediate image into the at least one candidate image based on a type of a target represented in each of the at least one target region. As used herein, a target refers to an organ or tissue of interest (e.g., a blood vessel, a lesion). For example, the intermediate image (e.g., an MRI image of the neck of a patient) may include a carotid artery region and a jugular vein region. The processing device 120 may generate a first candidate image of the carotid artery region and a second candidate image of the jugular vein region.

The candidate image may have any size. The sizes of different candidate images may be the same or different. For example, the size of the candidate image may relate to a size of a corresponding target region. A relatively large size of the target region may correspond to a relatively large size of the candidate image of the target region.

In some embodiments, the processing device 120 may generate a reference image by inputting the intermediate image into a segmentation model. The reference image may include at least one marker corresponding to the at least one target region. For example, each marker of the at least one marker may correspond to one target region of the at least one target region. The marker may include a color marker, a text marker, or the like, or any combination thereof. For example, different target regions may be marked with different colors in the reference image. As another example, different target regions may be marked with different texts (e.g., letters, numbers) in the reference image.

The segmentation model refers to a model (e.g., a machine learning model) or an algorithm for determining the reference image including the at least one marker corresponding to the at least one target region based on the intermediate image. For example, the processing device 120 may input the intermediate image into the segmentation model. The segmentation model may determine the at least one marker corresponding to the at least one target region in the intermediate image, to generate and output the reference image.

In some embodiments, the segmentation model may be of any type of machine learning model. Merely by way of example, the segmentation model may include an artificial neural network (ANN), a random forest model, a support vector machine, a decision tree, a convolutional neural network (CNN), a recurrent neural network (RNN), a deep learning model, a Bayesian network, a K-nearest neighbor (KNN) model, a generative adversarial network (GAN) model, a visual geometry group (VGG) network, a perceptron, a feedforward neural network (FNN), a radial basis function (RBF) network, a deep feedforward network, or the like.

In some embodiments, the segmentation model may be obtained by training a second preliminary model using a plurality of second training samples. Each second training sample may include a second sample image and a second standard image. The second sample image may include at least one target region. The second standard image may include at least one sample marker corresponding to the at least one target region. The training process of the segmentation model may be similar to the training process of the recognition model, and the detailed descriptions are not repeated here.

Further, the processing device 120 may generate the at least one candidate image based on the reference image. In some embodiments, for each marker of the at least one marker, the processing device 120 may generate a candidate image corresponding to the marker by weakening, based on the marker, a reference region in the reference image. The reference region (also referred to as an interference region) may be a region other than a target region corresponding to the marker in the reference image. For example, the processing device may weaken the reference region in the reference image by adjusting a brightness of the reference region (e.g., decreasing gray values of elements in the reference region) in the reference image.

For illustration purposes, the reference image may include a first marker corresponding to a first target region, and a second marker corresponding to a second target region. The processing device 120 may generate a first candidate image corresponding to the first marker by weakening a first reference region (i.e., the second target region corresponding to the second marker) in the reference image. The processing device 120 may generate a second candidate image corresponding to the second marker by weakening a second reference region (i.e., the first target region corresponding to the first marker) in the reference image.

According to some embodiments of the present disclosure, the reference image may be obtained based on the intermediate image using the segmentation model, the efficiency of determining the reference image may be improved, and accordingly the efficiency of determining the candidate image may also be improved.

In 620, the processing device 120 (e.g., the generation module 430) may generate at least one target image by performing a target processing operation on the at least one candidate image.

The target processing operation may be used to enhance a display of a target region in an image (e.g., the at least one candidate image), and weaken a display of other regions in the image (e.g., the at least one candidate image). In some embodiments, the target processing operation may include a maximum intensity projection operation. The maximum intensity projection refers to a technique for 3D data that projects in visualization plane voxels with maximum intensity that fall in a way of parallel rays traced from a viewpoint to a plane of projection.

In some embodiments, the processing device 120 may generate the at least one target image by performing the target processing operation on the at least one candidate image. For example, the processing device 120 may generate the target image (also referred to as a maximum intensity projection image) by performing the target processing operation on each of the at least one candidate image.

For illustration purposes, the processing device 120 may obtain an original image. The original image may include a first target region (e.g., an anterior circulation vessel region), a second target region (e.g., a posterior circulation vessel region), and a peripheral region (e.g., a scalp region). The processing device 120 may determine an intermediate image by removing the peripheral region from the original image. The processing device 120 may generate a first candidate image and a second candidate image by dividing the intermediate image based on a location of the first target region and a location of the second target region. The first candidate image may include the first target region. The second candidate image may include the second target region. The processing device 120 may generate a first target image by performing the maximum intensity projection operation on the first candidate image. The first target image may represent the first target region. The processing device 120 may generate a second target image by performing the maximum intensity projection operation on the second candidate image. The second target image may represent the second target region.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

In some embodiments, the model (e.g., the segmentation model, the recognition model, the processing model) may be updated from time to time, e.g., periodically or not, based on a sample set that is at least partially different from an original sample set from which an original model is determined. For instance, the model may be updated based on a sample set including new samples that are not in the original sample set, samples processed using an intermediate model of a prior version, or the like, or a combination thereof. In some embodiments, the determination and/or updating of the model may be performed on a processing device, while the application of the model may be performed on a different processing device. In some embodiments, the determination and/or updating of the model may be performed on a processing device of a system different than the medical system 100 or a server different than a server including the processing device 120 on which the application of the model is performed. For instance, the determination and/or updating of the model may be performed on a first system of a vendor who provides and/or maintains such a model and/or has access to training samples used to determine and/or update the model, while image processing based on the provided model may be performed on a second system of a client of the vendor. In some embodiments, the determination and/or updating of the model may be performed online in response to a request for image processing. In some embodiments, the determination and/or updating of the model may be performed offline.

Figure 7:
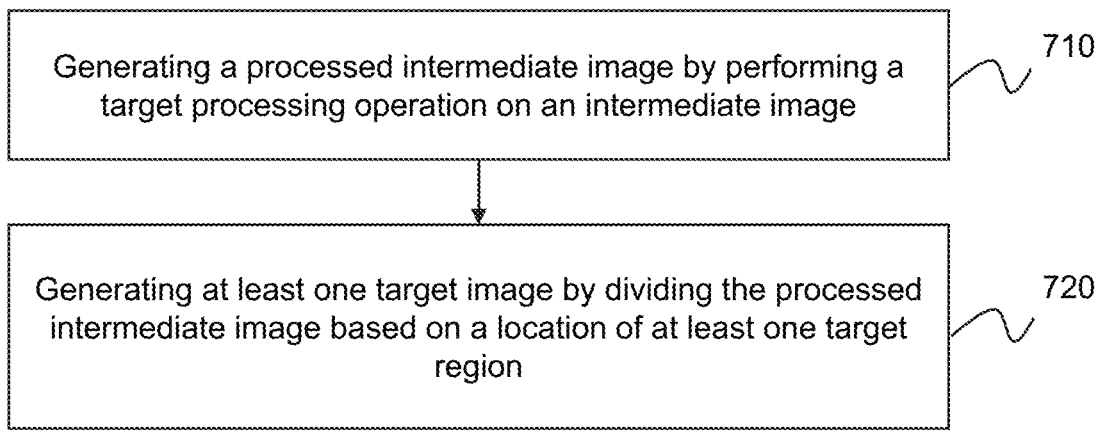
FIG. 7 is a flowchart illustrating an exemplary process for generating at least one target image according to some embodiments of the present disclosure.

FIG. 7 is a flowchart illustrating an exemplary process for generating at least one target image according to some embodiments of the present disclosure. In some embodiments, process 700 may be executed by the medical system 100. For example, the process 700 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 700. The operations of the illustrated process presented below are intended to be illustrative. In some embodiments, the process 700 may be accomplished with one or more additional operations not described and/or without one or more of the operations discussed. Additionally, the order of the operations of process 700 illustrated in FIG. 6 and described below is not intended to be limiting.

In 710, the processing device 120 (e.g., the generation module 430) may generate a processed intermediate image by performing a target processing operation on an intermediate image.

In some embodiments, the target processing operation may include a maximum intensity projection operation. For example, after the maximum intensity projection operation is performed on the intermediate image, a plurality of elements with the highest brightness (e.g., the highest gray values) in the intermediate image (e.g., a plurality of elements in a blood vessel region in the intermediate image) may be projected to obtain the processed intermediate image. In some embodiments, the processed intermediate image may include at least one target region.

In 720, the processing device 120 (e.g., the generation module 430) may generate at least one target image by dividing the processed intermediate image based on a location of at least one target region.

In some embodiments, the processing device 120 may divide the processed intermediate image into the at least one target image based on the location of the at least one target region. The division process of the processed intermediate image may be similar to the division process of intermediate image as described in connection with operation 610, and the descriptions of which are not repeated here.

According to some embodiments of the present disclosure, the processed intermediate image may be generated by performing the target processing operation on the intermediate image, and the at least one target image may be generated by dividing the processed intermediate image. Since the processed intermediate image includes the at least one target region but no peripheral region, the division process of the processed intermediate image may be (substantially) free from interference by other organs or tissue, which may improve the efficiency and accuracy of the division process of the processed intermediate image and the generation process of the at least one target image.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 8:
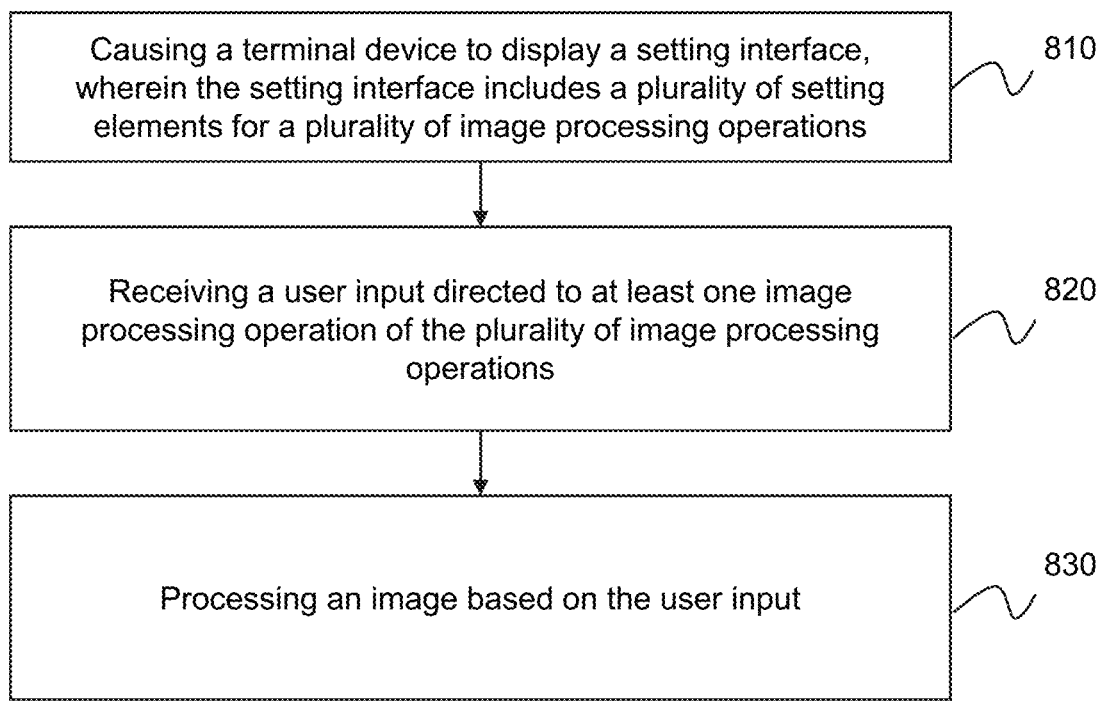
FIG. 8 is a flowchart illustrating an exemplary process for image processing according to some embodiments of the present disclosure.

FIG. 8 is a flowchart illustrating an exemplary process for image processing according to some embodiments of the present disclosure. In some embodiments, process 800 may be executed by the medical system 100. For example, the process 800 may be implemented as a set of instructions (e.g., an application) stored in a storage device (e.g., the storage device 130, the storage device 220, and/or the storage 390). In some embodiments, the processing device 120 (e.g., the processor 210 of the computing device 200, the CPU 340 of the mobile device 300, and/or one or more modules illustrated in FIG. 4) may execute the set of instructions and may accordingly be directed to perform the process 1000. The operations of the illustrated process presented below are intended to be illustrative. In some embodiments, the process 800 may be accomplished with one or more additional operations not described and/or without one or more of the operations discussed. Additionally, the order of the operations of process 800 illustrated in FIG. 8 and described below is not intended to be limiting.

In 810, the processing device 120 (e.g., the obtaining module 410) may cause a terminal device (e.g., the terminal 140) to display a setting interface. The setting interface may include a plurality of setting elements for a plurality of image processing operations.

In some embodiments, the plurality of setting elements may include a button, an icon, a checkbox, or the like, or any combination thereof. In some embodiments, the plurality of image processing operations may include a peripheral region removal operation, a maximum intensity projection operation, a down-sampling operation, a brightness normalization operation, an up-sampling operation, a binarization operation, a view angle setting operation, an image segmentation operation, an image classification operation, an image recognition operation, an image registration operation, an image fusion operation, an image scaling operation, an image rotation operation, an image cropping operation, or the like, or any combination thereof.

In 820, the processing device 120 (e.g., the obtaining module 410) may receive a user input directed to at least one image processing operation of the plurality of image processing operations.

In some embodiments, the user may select at least one setting element corresponding to the at least one image processing operation displayed on the setting interface of the terminal device via an input component of the terminal device (e.g., a mouse, a keyboard, a touch screen).

In 830, the processing device 120 (e.g., the determination module 420, the generation module 430) may process an image based on the user input.

For example, if the user input is directed to the peripheral region removal operation, the processing device 120 may obtain an original image, as described in connection with operation 510. The processing device 120 may determine an intermediate image by removing the at least one peripheral region from the original image, as described in connection with operation 520.

As another example, if the user input is directed to the peripheral region removal operation and the maximum intensity projection operation, the processing device 120 may obtain an original image, as described in connection with operation 510. The processing device 120 may determine an intermediate image by removing the at least one peripheral region from the original image, as described in connection with operation 520. The processing device 120 may generate at least one target image by performing the maximum intensity projection operation on the intermediate image, as described in connection with operation 530.

As still another example, if the user input is directed to the peripheral region removal operation, the maximum intensity projection operation, and the view angle setting operation (e.g., an interval angle setting operation), the processing device 120 may obtain an original image, as described in connection with operation 510. The processing device 120 may determine an intermediate image by removing the at least one peripheral region from the original image, as described in connection with operation 520. The processing device 120 may generate at least one target image by performing the maximum intensity projection operation on the intermediate image, as described in connection with operation 530. The processing device 120 may cause the terminal device to display a plurality of target images corresponding to a plurality of view angles of the target region. Merely by way of example, if an interval angle is set as 30°, a plurality of target images corresponding to a plurality of view angles (e.g., 0°, 30°, 60°, 90°, 120°, 150°, 180°, 210°, 240°, 270°, 300°, 330°, 360°) of the target region may be generated and displayed on the terminal device.

In some embodiments, the user input includes a plurality of instructions directed to two or more image processing operations of the plurality of image processing operations. The processing device 120 may perform the two or more image processing operations on the image sequentially based on an input order of the plurality of instructions. Additionally or alternatively, the processing device 120 may perform the two or more image processing operations on the image sequentially based on a preset order of the plurality of image processing operations.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure.

Figure 9:
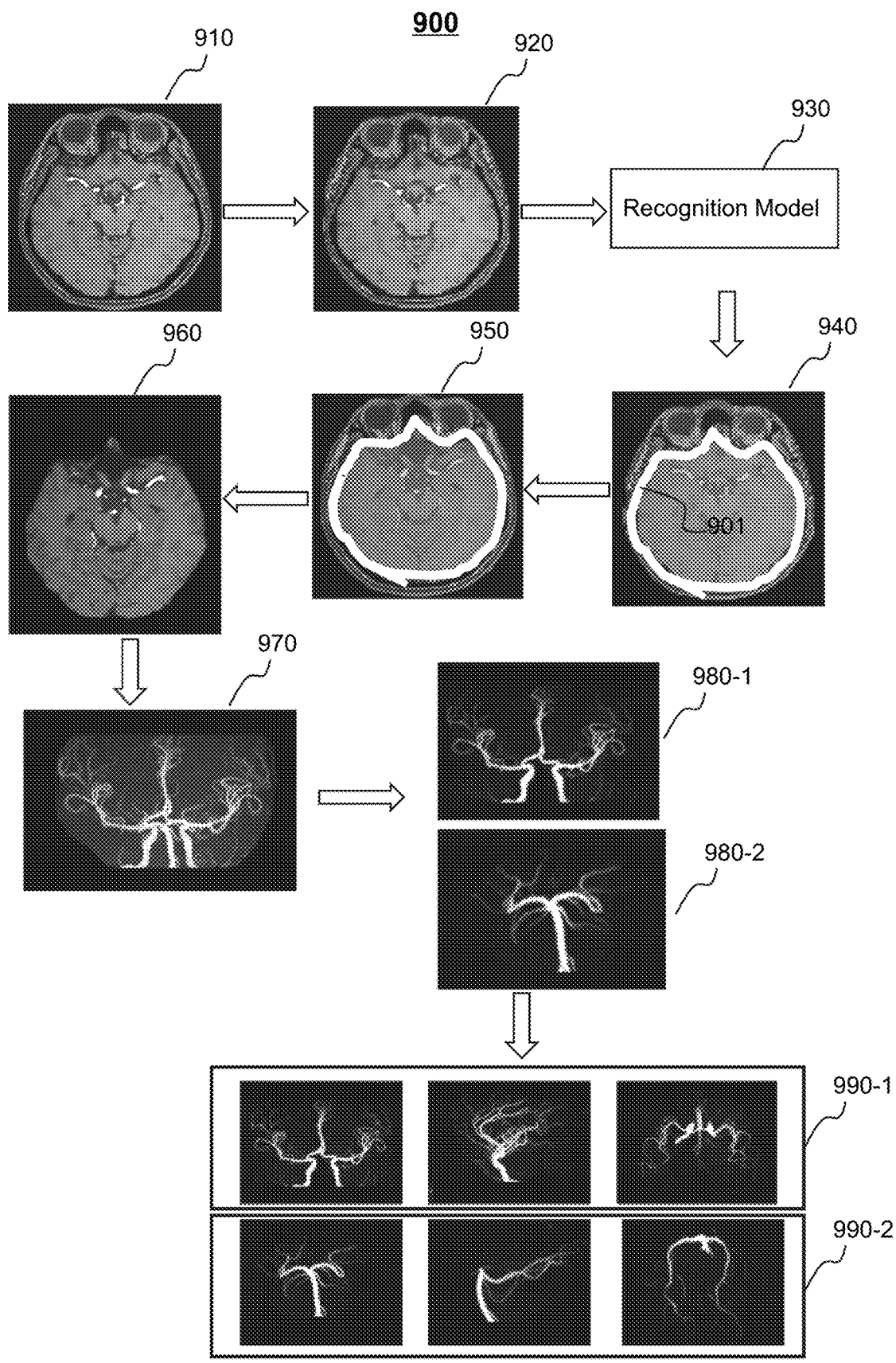
FIG. 9 is a schematic diagram illustrating an exemplary process for generating a plurality of target images according to some embodiments of the present disclosure.

FIG. 9 is a schematic diagram illustrating an exemplary process for generating a plurality of target images according to some embodiments of the present disclosure.

As illustrated in FIG. 9, the processing device 120 may obtain an original image 910 (e.g., an MRI image) of the head of a patient, as described in connection with operation 510. The original image may include a plurality of blood vessel regions (e.g., a first blood vessel region, a second blood vessel region) and a scalp region. The processing device 120 may obtain a second image 920 by performing a down-sampling operation on the original image 910, as described in connection with operation 520. The processing device 120 may obtain a third image by performing a brightness normalization operation on the second image 920, as described in connection with operation 520. The processing device 120 may obtain a first image 940 by inputting the third image into a recognition model 930. The first image may include a first region 901, and the scalp region is located outside the first region 901. The processing device 120 may obtain a mask image 950 by performing an up-sampling operation and a binarization operation on the first image 940, as described in connection with operation 520. The processing device 120 may obtain an intermediate image 960 by performing, based on the mask image 950, a masking operation on the original image 910, as described in connection with operation 520. The processing device 120 may obtain a processed intermediate image 970 by performing a maximum intensity projection operation on the intermediate image 960, as described in connection with operation 710. The processing device 120 may generate a plurality of target images by dividing the processed intermediate image based on locations of the plurality of blood vessel regions. For example, a first target image 980-1 may correspond to the first blood vessel region, and a second target image 980-2 may correspond to the second blood vessel region. In some embodiments, the processing device 120 may generate a plurality of target images 990-1 correspond to a plurality of view angles of the first blood vessel region, and a plurality of target images 990-2 correspond to a plurality of view angles of the second blood vessel region.

Figure 10:
FIG. 10 is a schematic diagram illustrating an exemplary original image and a plurality of exemplary target images according to some embodiments of the present disclosure.
Figure 10:
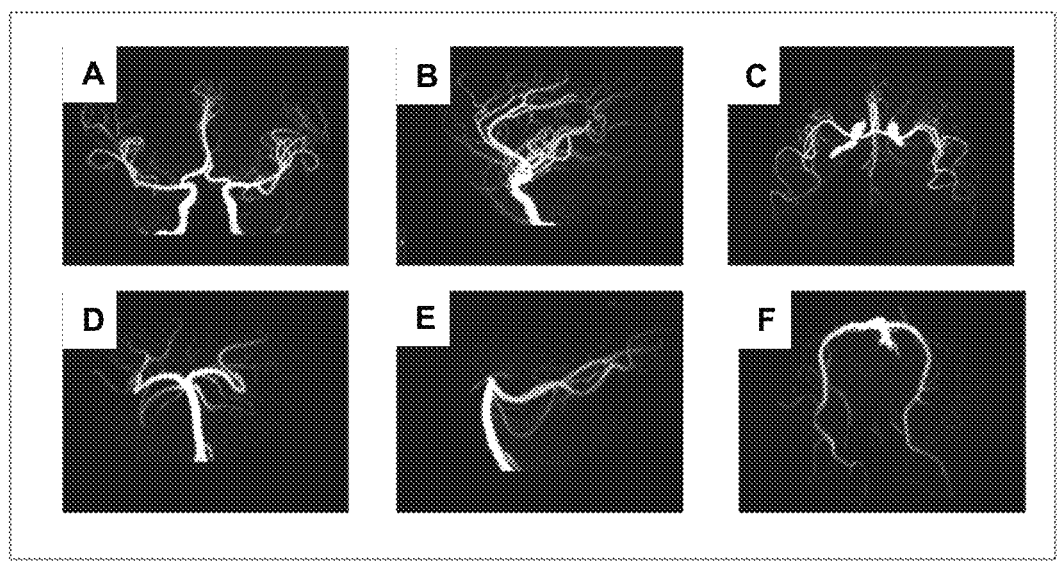

FIG. 10 is a schematic diagram illustrating an exemplary original image and a plurality of exemplary target images according to some embodiments of the present disclosure.

As illustrated in FIG. 10, an original image 1001 is an original MRI image of the head of a patient. The original image 1001 includes a plurality of blood vessel regions (e.g., a first blood vessel region, a second blood vessel region) and a scalp region. A target image A, a target image B, and a target image C are maximum intensity projection images correspond to a plurality of view angles of the first blood vessel region. A target image D, a target image E, and a target image F are maximum intensity projection images correspond to a plurality of view angles of the second blood vessel region.

Figure 11:
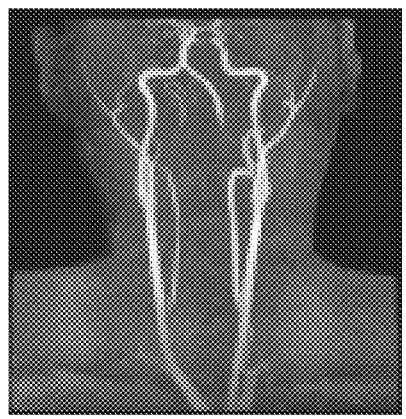
FIG. 11 is a schematic diagram illustrating an exemplary original image and an exemplary target image according to some embodiments of the present disclosure.
Figure 11:
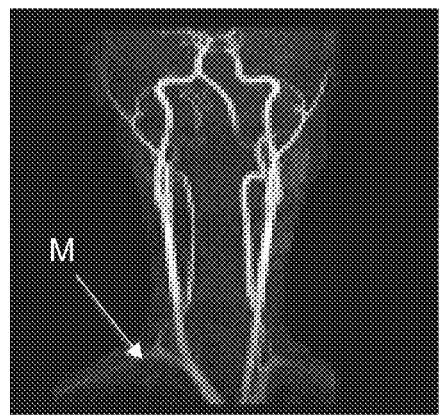

FIG. 11 is a schematic diagram illustrating an exemplary original image and an exemplary target image according to some embodiments of the present disclosure.

As illustrated in FIG. 11, an original image 1101 is an original MRI image of the neck of a patient. A target image 1102 is a maximum intensity projection image of a carotid artery generated based on the original image 1101 according to process 600, process 700, and/or process 800 of the present disclosure. It can be seen in FIG. 11, compared with the original image 1101, small branches of the carotid artery are more clearly shown in the target image 1102, as indicated by an arrow M in FIG. 11.

Figure 12:
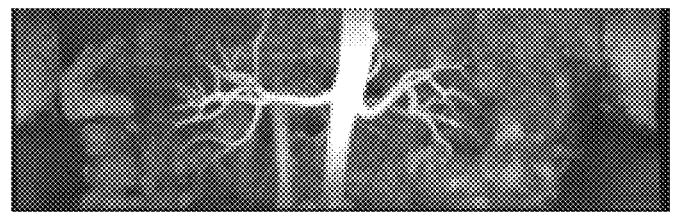
FIG. 12 is a schematic diagram illustrating an exemplary original image and an exemplary target image according to some embodiments of the present disclosure.
Figure 12:
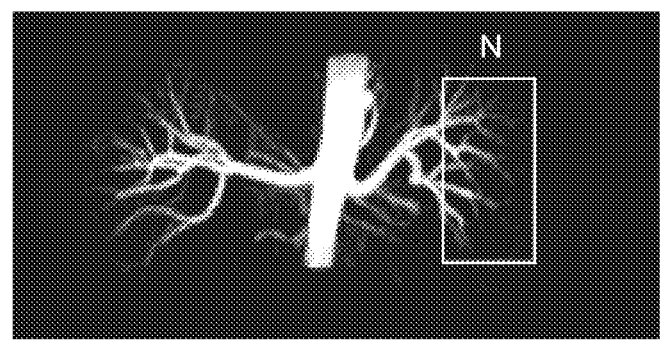

FIG. 12 is a schematic diagram illustrating an exemplary original image and an exemplary target image according to some embodiments of the present disclosure.

As illustrated in FIG. 12, an original image 1201 is an original MRI image of the kidney of a patient. A target image 1202 is a maximum intensity projection image of a renal artery generated based on the original image 1201 according to process 600, process 700, and/or process 800 of the present disclosure. It can be seen in FIG. 12, compared with the original image 1201, small branches of the renal artery are more clearly shown in the target image 1202, as indicated by a box N in FIG. 12.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "module," "unit," "component," "device," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claim subject matter lie in less than all features of a single foregoing disclosed embodiment.

What is claimed is:

1. A method for image processing, which is implemented on a computing device including at least one processor and at least one storage device, comprising:
    obtaining an original image, wherein the original image includes at least one blood vessel region and at least one scalp region;
    determining an intermediate image by removing the at least one scalp region from the original image; and
    generating at least one target image based on the intermediate image, wherein the at least one target image represents the at least one blood vessel region in the original image, wherein the generating at least one target image based on the intermediate image comprises:
        generating a reference image by inputting the intermediate image into a segmentation model, wherein the reference image includes at least one marker corresponding to the at least one blood vessel region;
        generating at least one candidate image based on the reference image; and
        generating the at least one target image by performing a maximum intensity projection operation on the at least one candidate image.

2. The method of claim 1, wherein the generating the at least one candidate image based on the reference image comprises:
    generating the at least one candidate image by dividing the intermediate image based on a location of the at least one blood vessel region.

3. The method of claim 1, wherein the generating the at least one candidate image based on the reference image comprises:
    for each marker of the at least one marker,
    generating a candidate image corresponding to the marker by weakening, based on the marker, a reference region in the reference image, wherein the reference region is a region other than a blood vessel region corresponding to the marker in the reference image.

4. The method of claim 1, wherein the at least one target image includes a first target image corresponding to a first blood vessel region and a second target image corresponding to a second blood vessel region.

5. The method of claim 1, wherein the determining an intermediate image by removing the at least one scalp region from the original image comprises:
    obtaining a first image based on the original image using a recognition model, wherein the first image includes a first region, and the at least one scalp region is located outside the first region;
    obtaining a mask image by performing a binarization operation on the first image; and
    determining the intermediate image by performing, based on the mask image, a masking operation on the original image.

6. The method of claim 5, wherein the obtaining a first image based on the original image using a recognition model comprises:
    obtaining a second image by performing a down-sampling operation on the original image;
    obtaining a third image by performing a brightness normalization operation on the second image; and
    obtaining the first image by inputting the third image into the recognition model.

7. The method of claim 6, wherein the obtaining a mask image by performing a binarization operation on the first image comprises:
obtaining a fourth image by performing an up-sampling operation on the first image; and
obtaining the mask image by performing the binarization operation on the fourth image.

8. The method of claim 1, wherein the at least one target image includes a plurality of target images corresponding to a plurality of view angles of each of the at least one blood vessel region.

9. The method of claim 1, wherein the original image includes a magnetic resonance imaging (MRI) image obtained using a time of flight (TOF)-magnetic resonance angiography (MRA) technique.

10. A system for image processing, comprising:
at least one storage device including a set of instructions; and
at least one processor configured to communicate with the at least one storage device, wherein when executing the set of instructions, the at least one processor is configured to direct the system to perform operations including:
obtaining an original image, wherein the original image includes at least one blood vessel region and at least one scalp region;
determining an intermediate image by removing the at least one scalp region from the original image; and
generating at least one target image based on the intermediate image, wherein the at least one target image represents the at least one blood vessel region in the original image, wherein the generating at least one target image based on the intermediate image comprises:
generating a reference image by inputting the intermediate image into a segmentation model, wherein the reference image includes at least one marker corresponding to the at least one blood vessel region;
generating at least one candidate image based on the reference image; and
generating the at least one target image by performing a maximum intensity projection operation on the at least one candidate image.

11. The system of claim 10, wherein the generating the at least one candidate image based on the reference image comprises:
generating the at least one candidate image by dividing the intermediate image based on a location of the at least one blood vessel region.

12. The system of claim 10, wherein the generating the at least one candidate image based on the reference image comprises:
for each marker of the at least one marker,
generating a candidate image corresponding to the marker by weakening, based on the marker, a reference region in the reference image, wherein the reference region is a region other than a blood vessel region corresponding to the marker in the reference image.

13. The system of claim 10, wherein the at least one target image includes a first target image corresponding to a first blood vessel region and a second target image corresponding to a second blood vessel region.

14. The system of claim 10, wherein the determining an intermediate image by removing the at least one scalp region from the original image comprises:
obtaining a first image based on the original image using a recognition model, wherein the first image includes a first region, and the at least one scalp region is located outside the first region;
obtaining a mask image by performing a binarization operation on the first image; and
determining the intermediate image by performing, based on the mask image, a masking operation on the original image.

15. The system of claim 14, wherein the obtaining a first image based on the original image using a recognition model comprises:
obtaining a second image by performing a down-sampling operation on the original image;
obtaining a third image by performing a brightness normalization operation on the second image; and
obtaining the first image by inputting the third image into the recognition model.

16. The system of claim 15, wherein the obtaining a mask image by performing a binarization operation on the first image comprises:
obtaining a fourth image by performing an up-sampling operation on the first image; and
obtaining the mask image by performing the binarization operation on the fourth image.

17. The system of claim 10, wherein the at least one target image includes a plurality of target images corresponding to a plurality of view angles of each of the at least one blood vessel region.

18. A non-transitory computer readable medium, comprising executable instructions that, when executed by at least one processor, direct the at least one processor to perform a method for image processing, the method comprising:
obtaining an original image, wherein the original image includes at least one blood vessel region and at least one scalp region;
determining an intermediate image by removing the at least one scalp region from the original image; and
generating at least one target image based on the intermediate image, wherein the at least one target image represents the at least one blood vessel region in the original image, wherein the generating at least one target image based on the intermediate image comprises:
generating a reference image by inputting the intermediate image into a segmentation model, wherein the reference image includes at least one marker corresponding to the at least one blood vessel region;
generating at least one candidate image based on the reference image; and
generating the at least one target image by performing a maximum intensity projection operation on the at least one candidate image.

* * * * *